United States Patent [19]

Merrill

[11] Patent Number: 4,469,123
[45] Date of Patent: Sep. 4, 1984

[54] COLD BOX VALVE

[75] Inventor: Peter K. Merrill, Norton, Mass.

[73] Assignee: McGraw-Edison Company, Rolling Meadows, Ill.

[21] Appl. No.: 503,774

[22] Filed: Jun. 13, 1983

[51] Int. Cl.³ .............................................. F16K 43/00
[52] U.S. Cl. ................................. 137/315; 137/454.6; 251/361
[58] Field of Search ................... 137/315, 454.2, 454.5, 137/454.6; 251/214, 360, 361

[56] References Cited

U.S. PATENT DOCUMENTS

| 17,973 | 8/1857 | MacDonald | 251/360 |
| 2,854,021 | 9/1958 | Baldwin, Jr. et al. | 251/361 |
| 3,389,717 | 6/1968 | Povalski et al. | 137/454.5 |
| 3,479,007 | 11/1969 | Buell | 251/214 |
| 3,506,242 | 4/1970 | Aunspach | 251/361 |
| 3,834,666 | 9/1974 | Keith | 251/361 |
| 3,876,179 | 4/1975 | Baumann | 137/315 |
| 4,337,788 | 7/1982 | Seger | 137/454.6 |

FOREIGN PATENT DOCUMENTS 2808094  8/1978  Fed. Rep. of Germany ... 137/454.2

Primary Examiner—George L. Walton
Attorney, Agent, or Firm—Jon Carl Gealow; James A. Gabala; Ronald Cooley

[57] ABSTRACT

A cold box valve, employed in cryogenic environments, includes a valve body assembly with a fluid inlet and a fluid outlet. The valve body assembly includes a valve body and bonnet. The bonnet seals the top of the valve body to which access to the valve internals is provided. A trim assembly, including an inner tube is removably mounted within the valve body. A cage is secured to the inner tube and a valve seat ring is removably mounted on the cage by at least one pin. Once assembled, the valve seat ring engages the valve body surrounding an opening between the valve inlet and valve outlet. A seal is mounted within the valve seat ring to provide a fluid seal between the valve seat ring and the valve body. A valve plug is reciprocally mounted within the cage and a stem connected to the plug extends out of the body to be connected to an actuator. A spring is mounted within the valve bonnet and engages the inner tube for biasing the valve seat ring into engagement with the valve body. A retainer is mounted within the valve bonnet that includes an extension for engaging a lip defined on the spring. Upon removal of the trim assembly, the retainer retains the spring within the valve bonet. Angled surfaces are fabricated on the inner peripheral surface of the valve body and are complementary to angled surfaces on the valve seat. The surfaces function to guide the trim assembly into the valve body during assembly.

6 Claims, 3 Drawing Figures

४,४६९,१२३

COLD BOX VALVE

BACKGROUND OF THE INVENTION

A. Field Of The Invention

The present invention relates to a new and improved valve and particularly, to a new and improved cold box valve including a unitized trim assembly with a valve seat ring and a spring and retainer assembly biasing the trim assembly and the valve seat ring into engagement with an opening between the inlet and outlet of the valve.

B. Description Of The Background Art

Cold box valves are employed in control systems that handle fluids at cryogenic temperatures. These fluids, such as liquid nitrogen, are typically at temperatures as low as −320° F. The valves are mounted at a 15° angle to the horizontal and are elongated. In this environment, the valve can be simultaneously subjected at the upper end to ambient temperatures and at the lower end to temperatures as low as −320° F. In these valves, the seal is located at the lower end and experiences drastic variances in temperature. For example, in the open position while liquid nitrogen is flowing through the valve, the temperature can be −320° F. Once the valve is closed, after two or three hours the lower end of the valve and valve seal return to approximately ambient temperature. It is desirable that the valve seat ring and seal be maintained in sealing engagement over these widely varying temperatures. It is also desirable that the seat ring and seal are easily repaired or replaced. Since the valve seat ring and seal are located at the lower end of the valve and the typical cold box valve includes a long extension or neck, servicing of the valve seat ring and seal is often extremely difficult and sometimes impossible necessitating complete removal and disassembly of the valve. If the valve can be disassembled and the valve seat ring and seal replaced, reassembly is often difficult since several separate parts must be properly positioned within the valve. Existing cold box valves include seals or gaskets that are separate parts and must be assembled prior to final assembly of the valve. An example of a valve that must be completely disassembled in order to remove and replace the valve seat and seal is illustrated in U.S. Pat. No. 3,206,165. The separate components of the valve illustrated in this patent are difficult to disassemble and reassemble particularly if the valve is installed in a system such as a cryogenic fluid line.

SUMMARY OF THE INVENTION

An object of the present invention is to provide a new and improved valve.

Another object of the present invention is to provide a new and improved cold box valve with a valve seat ring and seal that are easily replaced and reassembled.

Another object of the present invention is to provide a new and improved valve including guide surfaces allowing easy reassembly of the parts of the valve.

A further object of the present invention is to provide a new and improved cold box valve including a unitized trim assembly with a valve seat ring and a biasing member for biasing the valve seat ring into engagement with an opening between the outlet and inlet of the valve.

A still further object of the present invention is to provide a new and improved cold box valve including a unitized trim assembly which is biased by a spring that is retained within the valve body by a retainer, and which under normal conditions cannot be assembled incorrectly.

Briefly, the present invention is directed to a new and improved valve and more particularly, to a cold box valve employed to control the flow of a cryogenic fluid such as liquid nitrogen. The valve of the present invention is designed to allow trim components to be easily removed without special tools, training or effort. In addition, reassembly of the valve and trim components is simply accomplished due to the unitized nature of the trim assembly and the employment of guiding surfaces on the trim assembly and the interior of the valve. The valve is a globe type valve including a valve body with a fluid inlet and a fluid outlet and corresponding inlet and outlet chambers. An opening is provided between the chambers. An body extension extends from the valve body within which is removably positioned a trim assembly. The trim assembly includes an inner tube with a valve cage secured thereto. A valve seat ring is secured by pins to the cage and includes a valve seal. To assemble the valve, the unitized trim assembly is inserted into the valve body extension. Angled surfaces on the valve seat ring engage complementary surfaces on the interior of the valve guiding the valve seat ring into the opening between the inlet and outlet chambers. A plug on a stem is inserted within the trim assembly to a position within the cage. A bonnet assembly is then secured to the elongated portion of the body. Mounted within the bonnet assembly is a disc spring that engages the upper end of the trim assembly biasing the trim assembly and the valve seat ring into engagement with the opening between the inlet and outlet chambers. A spring retainer is press fit within the bonnet assembly and includes an extension that engages and retains the disc spring in the bonnet assembly.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DESCRIPTION OF THE PREFERRED EMBODIMENT

Figure 1:
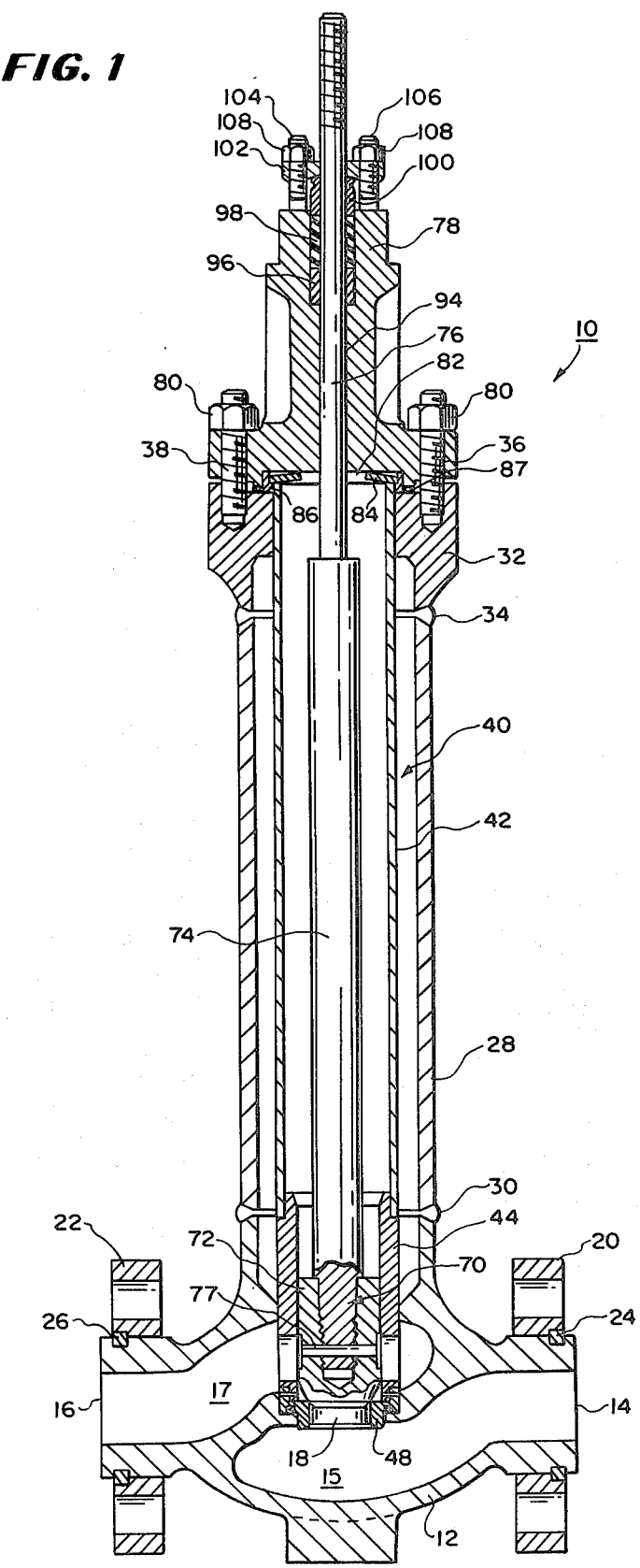
FIG. 1 is a vertical, cross sectional view of a valve constructed in accordance with the principles of the present invention.

While this invention is susceptible of embodiment in many different forms, there is shown in the drawings, and will herein be described in detail, one specific embodiment with the understanding that the present disclosure is to be considered an exemplification of the principles of the invention and is not intended to limiting the invention to the specific embodiment illustrated.

Referring to the drawings and initially to FIG. 1, there is illustrated a valve generally designated by the reference numeral 10. Valve 10 is of the cold box valve type and may be employed in cryogenic environments to control the flow of fluids such as liquid nitrogen.

The valve 10 includes a globe type valve body 12 with a fluid inlet 14, a fluid outlet 16, an inlet chamber 15 and an outlet chamber 17. An opening or aperture 18 provides fluid communication between the inlet chamber 15 and the outlet chamber 17. Depending on the system to which the valve 10 is to be secured, removable flanges 20 and 22 may be secured to the valve body 12 by split rings 24 and 26. Those skilled in the art will understand that, in some application, the fluid inlet and outlet are reversible. The description here only describes a valve that characterized as being "flow-to-open". The valve, with another seal, can also be run in the "flow-to-close" direction. The seal 56 used here would have the heel 58 on the inside diameter of the seal.

The valve body 12 includes an upward extending body portion 28 that may be integral with the body 12 or may be a separate part secured by a weld 30. An upper body portion 32 may also be integrally defined on the body portion 28 or may be secured by a weld 34. The upper body portion 32 includes threaded studs 36 and 38 (only two being shown to better illustrate the essence of the invention).

Figure 2:
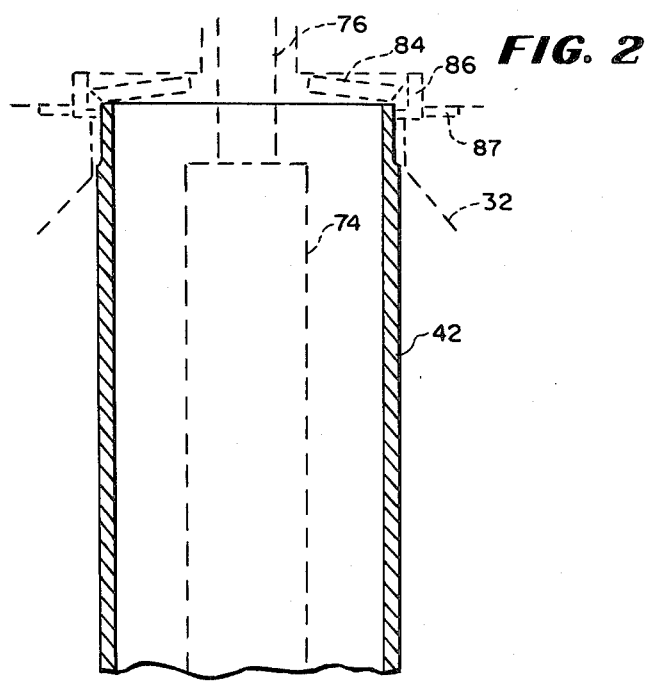
FIG. 2 is an enlarged, vertical cross sectional view of the trim assembly employed in the valve of the present invention.

A trim assembly generally designated by the reference numeral 40 is slideably positioned within the body portions 28, 32 and 12. The trim assembly 40 includes a cylindrical inner tube 42 (FIG. 2) to which a cage 44 is secured by brazing so as to form a single, unitized part. The cage 44 includes a plurality of ports 46 that communicate with the outlet chamber 17.

A valve seat or seat ring 48 is secured to the cage 44 by a pair of pins 50 and 52 that are removably secured within apertures extending through the seat ring 48 and cage 44. The seat ring 48 is annular with an opening 54 that, as illustrated in FIG. 1, communicates with the inlet chamber 15. A seal between the seat ring 48 and the valve body 12 surrounding the opening 18 is provided by a seat ring seal 56 (FIG. 2) that may be of a TEFLON and stainless steel materials. Seal 56 is of a U-shaped cross section in the embodiment illustrated with a heel 58. The seal 56 is press fit into a recess 60 in the seat ring 48 such that there is interference between the heel 58 and the recess 60 to retain the seal 56 during installation and removal of the trim assembly 40. The seal 56 includes legs 62 and 64 that expand outwardly upon the introduction of pressurized fluid between the legs 62 and 64 providing the desired seal.

The seat ring 48 also includes angled surfaces 66 and 68 that engage a complementary surface 70' formed on the inner periphery of the valve body 12. During installation of the trim assembly 40, as the trim assembly 40 is moved downwardly within the upper extension 28 of the valve body, the surfaces 66 and 68 engage the surface 70'. This engagement guides the trim assembly 40, seat ring 48, and seal 56 into position within the opening 18.

Once the trim assembly 40 has been positioned within the valve body, a plug and stem assembly generally designated by the reference numeral 70 is inserted within the trim assembly 40. The plug assembly 70 includes a plug 72 fabricated of bronze, stainless steel or carbon steel that is secured to a primary stem 74 by a pin 77. The primary stem 74 is pinned to a secondary stem 76 that may be attached to a pneumatic actuator (not shown) to reciprocate the plug 72 within the cage 44 thereby controlling fluid flow between the inlet 14 and the outlet 16.

Since cryogenic fluid flows through the valve body 12, the valve body 12 and valve seat ring 48 are subjected to widely varying temperatures. It is desirable that throughout this range of temperatures the seat ring 48 be in sealing engagement with the portion of the valve body 12 surrounding the opening 18. This is accomplished in the present invention by biasing the trim assembly 40 downwardly into engagement with the portion of valve body 12 surrounding the opening 18.

Figure 3:
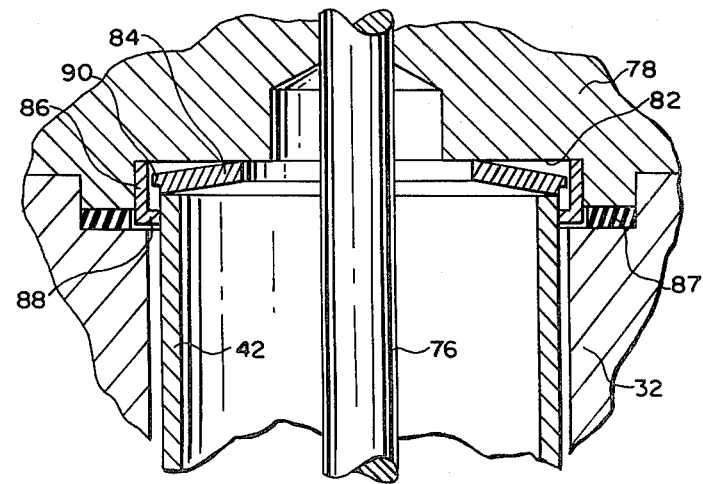
FIG. 3 is an enlarged, partial view of the disc spring and retainer employed in the valve of the present invention.

A bonnet 78 is secured to the upper portion 32 of the valve body by the studs 36 and 38 and nuts 80. A flat recess 82 is machined in the lower end of the bonnet 78 (FIG. 3) and an annular disc spring 84 is positioned within this recess 82. The annular disc spring 84 may be fabricated of a copper alloy such as beryllium copper commonly employed in cryogenic environments. An L-shaped spring retainer 86 is press fit within the recess 82. To ensure a proper seal between the upper portion 32 of the valve body and bonnet 78, a gasket 87 may be positioned between the bonnet 78 and the upper portion 32 of the valve body. The retainer 86 includes a horizontal leg 88 that will engage a peripheral lip 90 defined on the disc spring 84 such that upon removal of the bonnet 78 from the valve 10, the disc spring 84 is retained within the recess 82.

Valve 10 is assembled by placement of the trim assembly 40 and plug assembly 70 within the upper extension 28 of the valve body. Thereafter, the bonnet 78 is secured to the upper portion 32 of the valve body with the horizontal leg 88 of the retainer 86 guiding the inner tube 42 to the correct position such that the disc spring 84 engages the upper end of the inner tube 42. The disc spring 84 imparts a force that biases the seat ring 48 and seal 56 into engagement with the portion of the valve body 12 surrounding the opening 18. The secondary stem 76 extends through an elongated aperture 94 in the bonnet 78 and is encircled by a guide bushing 96, a packing 98 and a packing follower 100. These latter elements are maintained in position by a packing gland 102 secured to the upper end of the bonnet 78 by studs 104 and 106 and nuts 108.

From the foregoing it will be observed that numerous variations and modifications may be effected without departing from the true spirit and scope of the novel concept of the invention. In particular, the unitized trim assembly 40 and the retention of the disc spring 84 within the bonnet 78 by the retainer 86 allow for easy assembly and disassembly. This is because the spring 84 will not fall out of the bonnet 78 and the trim assembly 40 is one complete unit. Thus, this construction allows the seat ring 48 and seal 56 to be easily repaired or replaced without complete disassembly of the valve 10. It is to be understood that no limitations with respect to the specific apparatus illustrated here in is intended or should be inferred. It is, of course, intended to cover by the apended claims all such modifications as fall within the scope of the claims.

What is claimed and sought to be secured by U.S. Letters Patent is:

1. A retaining and guiding assembly for a valve, said valve including a valve body, an upward extending elongated body portion on said valve body, a trim assembly disposed in said body portion, a plug and stem assembly fitting within said trim assembly, a valve bonnet which is removably secured to the upper end of said body portion and which carries said plug and stem assembly, said retaining and guiding assembly comprising:

a retainer removably mounted in and carried by bonnet; and an annular conical disk spring, carried by said retainer, for engaging and biasing said trim assembly within said valve body, wherein said retainer is annular and has a generally L-shaped cross section so as to define a vertical leg and a horizontal leg, said vertical leg being disposed within said valve bonnet and said horizontal leg being inwardly disposed so as to engage the periphery of the upper end of said trim assembly and to radially position and align the upper end of said trim assembly and said retaining guiding assembly within the valve body during placement of said bonnet on said body portion and said valve bonnet and said retaining and guiding assembly being removed as a unit in removing said trim assembly.

2. The retaining and guiding assembly set forth in claim 1, wherein said trim assembly includes: an inner tube, a cage secured to the lower end of said inner tube, a valve seat ring removably secured to the lower end said cage, and a seal removably mounted on said seat ring, said disk spring engaging the upper end of said inner tube so as to bias said valve seat ring into engagement with with said valve body.

3. A valve, comprising:
a valve body including a fluid inlet, an internal flow port and a fluid outlet,
a valve body extension on said valve body,
a valve bonnet removably carried by said valve body extention,
a trim assembly slideably positioned in in said valve body extension and carried by said valve body around said flow port, said trim assembly including a valve seat ring sealingly engaging said internal flow port,
a valve plug which is slideably postioned in said valve bonnet and said trim assembly so as to be engageable with said valve seat ring to control fluid flow between said fluid inlet and said fluid outlet,
a conical disk spring removably carried by said bonnet and engaging said trim assembly to bias said valve seat ring into engagement with said internal flow port, and
a retainer removably mounted in said valve bonnet and surrounding said conical disk spring, said retainer including an extension disposed between said conical disk spring and said internal flow port to hold said conical disk spring in said valve bonnet upon removal of said bonnet from said valve body extension and said retainer extension being inwardly disposed so as to engage the periphery of the upper end of said trim assembly and to radially position and align the upper end of said trim assembly and to radially position and align the upper end of said trim assembly within the valve body during placement of said bonnet on said valve body extension.

4. The valve claimed in claim 3, wherein said valve seat ring is secured to said trim assembly by at least one removable pin.

5. The valve claimed in claim 3, wherein said valve body defines at the periphery of said internal flow port at least one angled surface,
and wherein said valve seat ring defines an angled surface on said valve seat ring which is complementary to said one angled surface, whereby said angled surfaces function as a guide during the assembly of said valve.

6. (Three Times Amended) A valve, comprising:
a valve body including a fluid inlet, an internal flow port and a fluid outlet,
a valve bonnet removably carried by said valve body extension,
a trim assembly slideably positioned in said valve body extension and carried by said valve body around said flow port, said trim assembly including a valve seat ring sealingly engaging said internal flow port,
a value plug which is slideably positioned in said valve bonnet and said trim assembly so as to be engageable with said valve seat ring to control fluid flow between said fluid inlet and said fluid outlet.
a conical disk spring removably carried by said bonnet and engaging said trim assembly to bias said valve seat ring into engagement with said internal flow port, and
a retainer removably mounted in said valve bonnet and surrounding said conical disk spring, said retainer including an extension disposed between said conical disk spring and said internal flow port to hold said conical disk spring in said valve bonnet upon removal of said bonnet from said valve body extension, said retainer extension being inwardly disposed so as to engage the periphery of the upper end of said trim assembly and to radially position and align the upper end of said trim assembly valve body during placement of said bonnet on said valve body extension.

* * * * *